United States Patent Office 3,320,754
Patented May 23, 1967

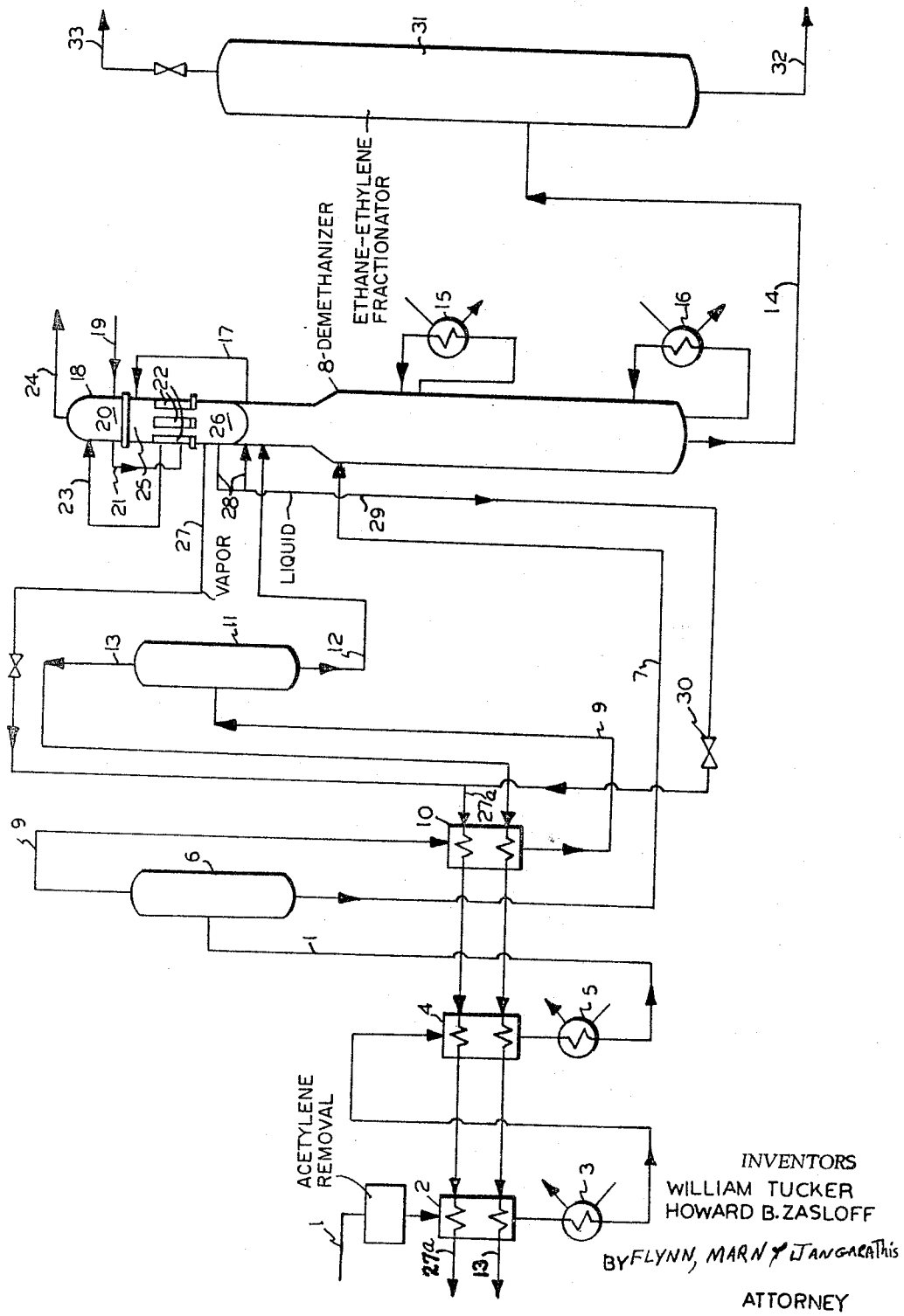

3,320,754
DEMETHANIZATION IN ETHYLENE RECOVERY WITH CONDENSED METHANE USED AS REFLUX AND HEAT EXCHANGE MEDIUM
William Tucker, Great Neck, N.Y., and Howard B. Zasloff, Rockaway, N.J., assignors to The Lummus Company, New York, N.Y., a corporation of Delaware
Filed Sept. 25, 1964, Ser. No. 399,201
7 Claims. (Cl. 62—28)

This invention relates to the recovery of substantially pure ethylene from gaseous mixtures. More particularly the invention relates to an improved process for the recovery of high purity ethylene from pyrolysis gas mixtures including hydrogen and methane by cooling and condensing ethylene at super-atmospheric pressure in a series of cooling steps and by de-methanization. The process makes use of hydrogen and methane-rich off-gases recovered from the mixture as refrigerants in the cooling and condensing steps.

As described in U.S. Patent No. 2,573,341, various gaseous mixtures containing ethylene are obtained as off-gases from petroleum refining units. In U.S. Patent No. 2,796,951, there is described pyrolysis of various hydrocarbons to produce a gaseous mixture containing ethylene and acetylene. Gaseous mixtures from such sources offer a very large potential supply of ethylene and other hydrocarbons which do not occur naturally but which are of great importance in the synthetic chemical field.

Among the various commercial processes for separation and recovery of ethylene from pyrolysis gases or refinery off-gas, absorption systems have been widely used due to their low initial investment and operational costs.

It has proved difficult, however, to efficiently and economically separate the desired ethylene from the other components of pyrolysis gases and refinery off-gas mixtures, for instance, the hydrogen and methane contained therein. Separation of ethylene from such undesired contaminant gases in the past has required the use of large and expensive equipment.

It is accordingly a principal object of our invention to provide an efficient and economical method for separating and recovering substantially pure ethylene from a gas mixture including hydrogen and methane.

Another object of our invention is to provide a process for removal of hydrogen and methane from the overhead from the deethanization section in an ethylene plant.

A further object is to provide an efficient and economical cooling system for condensation of ethylene from a gaseous mixture and for removal of lighter components as overhead.

Other objects and a fuller understanding of the invention may be had by referring to the following description, taken in conjunction with the accompanying drawing which is a schematic flow diagram illustrating a preferred embodiment of our invention for separating ethylene from a gaseous mixture including hydrogen, methane and ethane.

According to the invention, advantage is taken of the low temperature at which hydrogen and methane are removed from an ethylene containing gas mixture to furnish, in a new way, a portion of the cold requirements for pre-cooling and condensing the ethylene containing portion of a gaseous mixture to obtain a low temperature condensate which may be easily demethanized.

The hydrogen stream is of such purity, pressure and quantity that it may be used in hydrogenation of cracked naphthas. The methane stream may be used, for example to reactivate the alumina used to dry the gas prior to depropanization thereof.

A feature of the invention is that feed composition changes and compression system fluctuations may be easily regulated and the demethanizer tower product accurately controlled. Also, the process of the invention eliminates the requirement for using low temperature pumps to return reflux.

In the following description of the invention, the stages of the plant preceding ethylene recovery, including the processing steps in which the $C_2$ and lighter components are separated from the $C_3$ and heavier components are not depicted. It is to be noted that $C_3$'s, heavier components and acetylene or any of them may be removed before or after ethylene recovery according to the invention. It is preferred, however, that acid gases be removed prior to treatment according to the invention.

A pyrolysis gas mixture to be treated in accordance with our invention may be obtained by pyrolysis of propane, butane, naphtha or other light oil charge stock. Composition of the pyrolysis gas mixture will vary depending upon the conditions at which cracking is carried out and the nature of the charge stock used; small quantities of inert gases do not affect operation of the process.

Table I below gives the characteristics of a typical naphtha feed which may be used as plant charge stock:

TABLE I.—FEED CHARACTERISTICS

| | |
|---|---|
| API gravity | 66.4 |
| ASTM distillation, ° F.: | |
| Initial | 106 |
| 5% | 144 |
| 10% | 153 |
| 50% | 230 |
| 90% | 301 |
| 95% | 315 |
| End point | 322 |
| Motor octane number | 46 |
| Sulphur, wt. percent | 0.04 |
| Vapor pressure, Reid | 5.4 |

Before processing the mixture according to the invention most of the components heavier than ethylene are preferably separated and removed in steps which may include gasoline fractionation, depentanization, drying, depropanization, deethanization and drying of the deethanizer overhead, to reduce the dew points of the gases below the levels at which freezeups or blockages would otherwise occur at the lower temperatures encountered in the subsequent processing steps. In the embodiment described, it is to be considered that acetylene and $C_3$'s have been removed prior to deethanization although, as previously noted, removal thereof may by deferred until after ethylene recovery. Following deethanization and drying, the pyrolytic gaseous mixture including hydrogen, methane, ethylene and ethane is introduced to the recovery system of the invention.

According to the invention, hydrogen along with non-condensables are removed from the feed by cooling and partially condensing the pyrolytic gas mixture at super-atmospheric pressure in a low temperature, so-called cold section, in successively colder refrigerating stages at substantially constant pressures. The ethylene rich condensates are then introduced into the demethanizer. Inasmuch as substantially constant pressures are maintained in the processing lines and zones preceding the demethanizer, compression requirements downstream of the deethanizer are completely eliminated. Most of the hydrogen, a minor portion of methane and the non-condensables in the mixture are taken as a hydrogen off-gas overhead from the final flash zone of a series of at least two flash zones. The remaining, major portion of methane is taken as off-gas from the demethanizer. The hydrogen off-gas and methane off-gas, either alone or with separate refrigerants such as propylene and ethylene obtained at low temperatures from elsewhere in the plant, are then employed upstream to furnish the cooling requirements in the cold section in indirect heat exchange passage against feed. The cold potential of liquid methane in the range of −200° to −300° F. is, of course, very great, so other refrigerants will not generally be needed.

Referring now to the embodiment depicted in the drawing, the dry deethanizer overhead feed, at a low temperature and relatively high pressure, upon leaving the deethanizer (not shown) and the following guard drier (not shown) in line 1 is passed successively through heat exchanger 2, refrigerated cooler 3, heat exchanger 4 and refrigerated cooler 5 in which the mixture is cooled to about liquifaction temperature and a portion thereof is condensed. Of course, a large number of exchangers and coolers may be employed if required. The cooled feed is introduced into a primary flash drum 6 wherein the gaseous and liquid phases are separated. The primary flash drum bottoms, containing about 95% of all the $C_2$'s together with a substantial amount of methane, are removed via line 7 and are introduced at an intermediate level into demethanizer tower 8.

The uncondensed feed in the primary flash drum overhead in line 9 is passed through heat exchanger 10 where the overhead is further cooled and an additional portion is condensed. The additional condensate and the remaining uncondensed gases in line 9 are then passed into secondary flash drum 11 where gaseous and liquid phases are separated. Substantially all of the remaining $C_2$'s are removed via line 12 as secondary flash drum bottoms. The secondary flash drum bottoms, being more volatile and containing about 5% of the ethylene and ethane of the feed gas mixture and the remaining portion of the methane not removed in the primary flash drum bottoms, are introduced through line 12 into demethanizer 8 above the level at which the heavier, primary flash drum bottoms in line 7 are introduced into demethanizer 8. Again, in some installations the use of additional flash drums operating in the same manner as described hereinabove may be preferred.

Thus, substantially all of the ethylene and ethane in the starting gaseous mixture enters demethanizer 8 free of lighter constituents, except for the major portion of methane not removed as overhead in the secondary flash drum.

The hydrogen-rich overhead from secondary flash drum 11 is passed via line 13 through heat exchanger 10 countercurrently to the overhead from the primary flash drum in line 9, to furnish a portion of the cooling requirements of heat exchanger 10. Upon leaving heat exchanger 10, the secondary flash drum overhead is passed in line 13 in succession through heat exchangers 4 and 2, countercurrently to the starting gaseous mixture in line 1, to furnish a portion of the cooling requirements of heat exchangers 4 and 2.

The bottoms from primary flash drum 6, containing about 95% of the $C_2$'s, and the bottoms from secondary flash drum 11, containing substantially all of the remaining ethylene and ethane as well as methane, are thus introduced via lines 7 and 12, respectively, into demethanizer 8 at different levels as described above. Using at least two flash drums 6 and 11 insures the maintenance of steady operating conditions in demethanizer 8, since the flash drums act as surge drums to smooth out the effects of changes in the charge stock and fluctuations in upstream compression systems.

Ethylene and ethane are withdrawn from demethanizer 8 as bottoms in line 14 while methane and lighter components are withdrawn as overhead in gaseous phase via line 17. Reboilers 15 and 16 furnish the heat requirements for demethanization. Reboiler 15 may be heated by condensing ethylene while reboiler 16 may be heated by condensing propylene. Positive product control is provided by maintaining the heat input into reboiler 15 and 16 in response to changes sensed by a temperature controller or methane analyzer (not shown) positioned at a selected level in the demethanizer 8. At the higher temperature and lower pressure prevailing in demethanizer 8, as compared to conditions in the flash drums, substantially all of the methane and remaining light components are taken as overhead via line 17. The methane and light components in line 17 are introduced into a novel reflux system consisting of a refrigerated reflux condenser 18 including refrigerant inlet line 19, upper refrigerant chamber 20, descending refrigerant line 21, lower refrigerant chamber 22, ascending refrigerant line 23, refrigerant outlet line 24, upper methane chamber 25, lower methane chamber 26, methane vapor outlet line 27, and liquid methane outlet line 28. The refrigerated reflux condenser 18 is mounted directly above methanizer 8.

The methane and lighter components comprising the demethanizer overhead in line 17 are passed into the upper methane chamber 25 wherein a portion is condensed against ethylene refrigerant. The condensate accumulates in the lower methane chamber 26 after further condensation against ethylene refrigerant in lower refrigerant chamber 22. A portion of the condensate is passed by gravity flow via line 28 to demethanizer 8 to satisfy reflux requirements of demethanizer 8. Use of the runback reflux system according to the invention avoids the necessity for using very low temperature pumps to return reflux to the demethanizer, which would be required if a conventional reflux system were used in which tower overhead would be passed downward to be condensed and reflux pumped up to the upper portion of the tower. The main methane condensate stream is withdrawn from demethanizer 8 through lines 28 and 29.

Gaseous methane leaves lower methane chamber 26 via line 27 from a point above the liquid level of condensed methane. The gaseous methane in line 27 and the liquid methane in line 29 together constitute the net methane overhead of demathanizer 8.

The main methane condensate stream after satisfying reflux requirements and the uncondensed methane are then used as refrigerant against feed in the following manner. Liquid methane recovered in line 29 is passed through expansion valve 30, is combined with the expanded vapor in line 27, and the combined liquid vapor stream is introduced into line 27a. Of course, if it is desired to use either the vapor in line 27 or the liquid in line 29 elsewhere in the plant, the remaining stream can be fed to line 27a by itself.

The combined methane vapor stream in line 27 is then passed in succession through heat exchanger 10 countercurrently against the primary flash drum overhead in line 9 and thereafter through indirect heat exchangers 4 and 2 countercurrently against the starting gaseous mixture in line 1 to furnish the remaining portion of the cooling requirements of heat exchangers 10, 4 and 2.

The starting gaseous mixture may be further cooled as required by supplemental refrigerating means, for instance by refrigerated coolers 3 and 5, as shown in the drawing.

The demethanizer tower bottoms, containing substantially all of the ethylene and ethane in the feed, leave in line 14 and are flashed into ethylene fractionator 31 wherein separation is performed between the ethane, drawn off as bottoms in line 32, and the ethylene product, taken as overhead in line 33. The ethylene fractionator 31 can be operated at a considerably lower pressure than the demethanizer 8, generally in the range of 100 to 300 p.s.i.g., inasmuch as the lighter, undesired constituents of the starting gaseous mixture including hydrogen and methane have previously been removed.

Table II below is illustrative of operating conditions under which the process may be conducted according to the embodiment depicted in the drawing.

TABLE II.—SUMMARY OF OPERATING CONDITIONS

| Component/Stream | Pressure, p.s.i.g. | Temperature, °F. |
|---|---|---|
| Primary Flash Drum 6 | 455 | −135 |
| Line 7 | | −135 |
| Secondary Flash Drum 11 | 450 | −170 |
| Line 12 | | −170 |
| Demethanizer 8 | 435 | 10 |

As an example of the invention, dry deethanizer overhead vapor comprising hydrogen, methane and essentially all of the ethylene and ethane of a pyrolytic gas mixture are chilled and partially condensed by heat exchange against cooler hydrogen and methane off-gas to minus 135° F. and introduced into a primary flash drum from which 95% of the ethylene and ethane liquefied by the cooling are taken as bottoms together with substantial amounts of methane.

The primary flash drum bottoms are charged to a demethanizer. The vaporous hydrogen, methane and remaining ethylene and ethane comprising the primary flash drum overhead are further chilled against off-gas to minus 170° F. and are conducted into a secondary flash drum in which the phases are separated. Substantially all the remaining ethylene and ethane and much of the remaining methane are taken as secondary flash drum bottoms and are also charged to the demethanizer. The secondary flash drum overhead consisting in large part of hydrogen is passed as hydrogen off-gas coolant countercurrently against feed.

From the reboiled demethanizer the remaining methane is taken overhead and after reflux requirements are met is also reheated against feed in the same manner as the hydrogen off-gas.

The ethylene and ethane of the orginal gas mixture, now substantially free of all other constituents, are taken as bottoms from the demethanizer and are fractionated in an ethylene fractionator to obtain a highly pure ethylene product comprising 99.5% or more ethylene by weight.

The composition of the principal process streams according to this example is set forth in the Table III below in terms of the flow rates of the constituents of the various streams.

While there is shown and described a preferred form of the invention, it is considered apparent that variations may be made thereof and it is therefore desired that a broad interpretation be given the invention within the scope of the disclosure herein and the following claims.

We claim:

1. A process for recovering ethylene from a gaseous mixture containing: hydrogen, methane ethylene, and ethane comprising:
   (a) passing said mixture through a first heat exchange zone wherein said mixture is cooled by indirect heat transfer to condense a portion thereof;
   (b) separating said condensed portion obtained in step (a) and introducing said condensed portion into a demethanization fractionation zone;
   (c) passing the uncondensed portion from step (a) through a second heat exchange zone wherein said uncondensed portion is cooled by indirect heat transfer to condense another portion;
   (d) passing the condensed portion from step (c) to the demethanization fractionation zone;
   (e) passing the uncondensed portion from step (c) through said first and second heat exchange zones to effect cooling by indirect heat transfer;
   (f) recovering a methane rich overhead from said fractionation zone;
   (g) cooling the methane rich overhead to condense a portion thereof;
   (h) returning a portion of the condensed methane rich overhead to the demethanization fractionation zone as reflux;
   (i) passing the remaining portion of the condensed methane rich portion and the uncondensed methane rich overhead through the first and second heat exchange zones to effect cooling by indirect heat transfer;
   (j) recovering the bottoms from said demethanization fractionation zone and introducing said bottoms into a second fractionation zone; and
   (k) recovering an ethylene rich overhead from the second fractionation zone.

2. Process for recovery of pure ethylene from a gaseous mixture including hydrogen, methane, ethylene and ethane comprising:

TABLE III.—FLOW RATES OF THE COMPONENTS OF PRINCIPAL PROCESS STREAMS
[Lb. mol/hr.]

| Component | Dry Deethanizer Overhead (Line 1) | Primary Flash Drum Overhead (Line 9) | Primary Flash Drum Bottoms (Line 7) | Secondary Flash Drum Overhead (Line 13) (Hydrogen Off-Gas) | Secondary Flash Bottoms (Line 12) | Total Feed (Lines 7 and 12) | Demethanizer (8) Overhead (Lines 27 and 29) (Methane Off-Gas) | Demethanizer (8) Bottoms (Line 14) | Ethylene Fractionator (31) Ethane Recycle (Line 32) | Ethylene Fractionator (31) Product Ethylene (Line 33) |
|---|---|---|---|---|---|---|---|---|---|---|
| Hydrogen | 240.9 | 225.9 | 15.0 | 225.2 | 0.7 | 15.7 | 15.7 | | | |
| Methane | 393.4 | 121.9 | 271.5 | 105.1 | 16.8 | 288.3 | 287.8 | 0.5 | | 0.5 |
| Ethylene | 455.1 | 16.0 | 439.1 | 4.2 | 11.8 | 450.9 | 0.3 | 450.6 | 2.9 | 447.7 |
| Ethane | 137.7 | 0.2 | 137.5 | | 0.2 | 137.7 | | 137.7 | 137.2 | 0.5 |
| Propylene | 2.1 | | 2.1 | | | 2.1 | | 2.1 | 2.1 | |
| Propane | 0.7 | | 0.7 | | | 0.7 | | 0.7 | 0.7 | |
| Total | 1229.9 | 364.0 | 865.9 | 334.5 | 29.5 | 895.4 | 303.8 | 591.6 | 142.9 | 448.7 |

The invention has been described as it may be applied to separation of ethylene and ethane from a gaseous feed mixture of hydrogen, methane, ethylene, ethane by cooling and condensing the mixture, flashing off and utilizing hydrogen and some methane as a coolant against the feed mixture countercurrently before and after flashing off the hydrogen containing portion, and steadily feeding the cooled condensate from the feed mixture into a demethanizing zone as bottoms from two flash or surge drums thereby facilitating maintenance of stable operating conditions therein.

(a) cooling and partially condensing said gaseous mixture at superatmospheric pressure in a first heat exchange contact to form condensate containing a major portion of the ethylene and ethane along with some of the methane on the one hand, and a gaseous phase containing substantially all of the hydrogen, the remaining methane and the remaining ethylene and ethane on the other hand, (b) introducing said condensate and said gaseous phase into a primary flash zone, (c) passing the bottoms containing approximately 95% of the starting ethylene and ethane from said primary flash zone,
(d) passing the overhead from said primary flash zone,
(e) cooling and partially condensing said overhead from said primary flash zone at superatmospheric pressure in a second heat exchange contact to form additional condensate containing substantially all the remaining ethylene and ethane and some methane, and an additional gaseous phase containing substantially all the hydrogen and the remaining methane,
(f) introducing said additional condensate and said additional gaseous phase into a secondary flash zone,
(g) passing the bottoms containing most of the remainder of the starting ethylene and ethane from said secondary flash zone,
(h) introducing said primary flash zone bottoms and said secondary flash zone bottoms at separate points into a demethanizing zone,
(i) heating said bottoms from said flash zones in said demethanizing zone to form a methane overhead and an ethylene and ethane containing demethanizing zone bottoms,
(j) cooling and condensing a portion of said methane overhead to form a methane condensate,
(k) refluxing a portion of said methane condensate to said demethanizing zone,
(l) passing the remaining portion of said methane condensate and the uncondensed portion of said methane overhead countercurrently in indirect heat exchange contact against the primary flash drum overhead and thereafter countercurrently in indirect heat exchange contact against said gaseous mixture to furnish a portion of the cooling requirements of said first and second heat exchange contact,
(m) passing the overhead from said secondary flash zone,
(n) passing said overhead from said secondary flash zone countercurrently in indirect heat exchange contact against said primary flash drum overhead and thereafter countercurrently in indirect heat exchange contact against said gaseous mixture to furnish a further portion of the cooling requirements of said first and second heat exchange contacts,
(o) passing said ethylene and ethane containing demethanizing zone bottoms from the demethanizing zone,
(p) fractionating said demethanizing zone bottoms to form an ethane containing liquid stream and a pure ethylene vapor phase, and
(q) recovering said pure ethylene vapor phase as product ethylene.

3. Process for recovery of pure ethylene from a gaseous mixture including hydrogen, methane, ethylene and ethane comprising:
(a) cooling and partially condensing said gaseous mixture at superatmospheric pressure in a first heat exchange contact to form condensate containing a major portion of the ethylene and ethane along with some of the methane on the one hand and a gaseous phase containing substantially all of the hydrogen, the remaining methane and the remaining ethylene and ethane on the other hand,
(b) additionally cooling and condensing said gaseous mixture against a first refrigerant and a second refrigerant to form a condensate and a gaseous phase,
(c) introducing said condensate and said gaseous phase into a primary flash zone,
(d) passing the bottoms containing about 95% of the starting ethylene and ethane from said primary flash zone,
(e) passing the overhead from said primary flash zone,
(f) cooling and partially condensing said overhead at superatmospheric pressure in a second heat exchange contact to form additional condensate containing substantially all the remaining ethylene and ethane and some methane, and an additional gaseous phase containing substantially all the hydrogen and the remaining methane,
(g) introducing said additional condensate and said additional gaseous phase into a secondary flash zone,
(h) passing the bottoms containing most of the remainder of the starting ethylene and ethane from said secondary flash zone,
(i) introducing said primary flash zone bottoms at an intermediate level and said secondary flash zone bottoms at a higher level into a demethanizing zone,
(j) heating said bottoms after introduction into said demethanizing zone to form a methane overhead and a pure ethylene and ethane demethanizing zone bottoms,
(k) cooling and condensing a portion of said methane overhead to form a methane condensate,
(l) returning a portion of said condensate to said demethanizing zone as reflux,
(m) passing the remaining portion of said methane condensate and the uncondensed portion of said methane overhead countercurrently in indirect heat exchange contact against the primary flash drum overhead and thereafter countercurrently in indirect heat exchange contact against said gaseous mixture to furnish a portion of the cooling requirements of said first and second heat exchange contacts,
(n) passing said second gaseous phase as overhead from said secondary flash zone,
(o) passing said second gaseous phase countercurrently in indirect heat exchange contact against the primary flash drum overhead and thereafter countercurrently in indirect heat exchange contact against said gaseous mixture to furnish the remaining portion of the cooling requirements of said first and second heat exchange contacts,
(p) removing and fractionating said ethylene and ethane containing demethanizing zone bottoms to form an ethylene containing vapor phase and an ethane containing liquid phase, and
(q) recovering said ethylene containing vapor phase as pure product ethylene.

4. Process for recovery of pure ethylene from a gaseous mixture including hydrogen, methane, ethylene and ethane comprising:
(a) cooling and partially condensing said gaseous mixture at superatmospheric pressure in a first heat exchange contact to form a first condensate containing a major portion of the ethylene and ethane along with some of the methane and a first gaseous phase containing substantially all of the hydrogen, remaining methane and the remaining ethylene and ethane,
(b) additionally cooling said gaseous mixture against a first refrigerant and a second refrigerant,
(c) introducing said first condensate and said first gaseous phase into a primary flash zone,
(d) passing the bottoms containing about 95% of the starting ethylene and ethane from said primary flash zone,
(e) passing the overhead from said primary flash zone,
(f) cooling and partially condensing said overhead from said primary flash drum at superatmospheric pressure in a second heat exchange contact to form additional condensate containing substantially all the remaining ethylene and ethane, and an additional hydrogen rich gaseous phase containing substantially all the hydrogen and the uncondensed methane from said overhead,
(g) introducing said additional condensate and said additional gaseous phase into a secondary flash zone,
(h) passing the bottoms from said secondary flash zone, (i) introducing said primary flash zone bottoms and said secondary flash zone bottoms separately into a demethanizing zone, (j) furnishing the heat requirements of said demethanizing zone by condensation of propylene adjacent the bottom of said demethanizing zone for use as said first refrigerant and by condensation of ethylene at a point adjacent the central third of said demethanizing zone for use as said second refrigerant, (k) heating said primary and secondary flash drum bottoms after introduction into said demethanizing zone to form a methane overhead and an ethylene and ethane containing demethanizing zone bottoms, (l) cooling and condensing a portion of said methane overhead to form a methane condensate, (m) returning a portion of said methane condensate as reflux to said demethanizing zone, (n) passing the remaining portion of said methane condensate and the uncondensed portion of said methane overhead countercurrently in indirect heat exchange contact against the primary flash drum overhead and thereafter countercurrently in indirect heat exchange contact against said gaseous mixture to furnish a portion of the cooling requirements of said first and second heat exchange contacts, (o) passing the overhead from said secondary flash zone, (p) passing said overhead from said secondary flash zone countercurrently in indirect heat exchange contact against the primary flash drum overhead and thereafter countercurrently in indirect heat exchange contact against said gaseous mixture to furnish the remaining portion of the cooling requirements of said first and second heat exchange contacts, (q) removing and fractionating said ethylene and ethane containing bottoms from the demethanizing zone into an ethane containing liquid phase and an ethylene containing vapor phase, and (r) recovering said ethylene containing vapor phase as pure product ethylene.

5. Process for recovery of pure ethylene from a gaseous mixture including hydrogen, methane, ethylene and ethane comprising:

(a) cooling and partially condensing said gaseous mixture at superatmospheric pressure in a first heat exchange contact to form a first condensate containing a major portion of the ethylene and ethane along with some of the methane and a first gaseous phase containing substantially all of the hydrogen, remaining methane and the remaining ethylene and ethane, (b) additionally cooling said gaseous mixture against a first refrigerant and a second refrigerant, (c) introducing said first condensate and said first gaseous phase into a primary flash zone, (d) passing the bottoms containing about 95% of the starting ethylene and ethane from said primary flash zone, (e) passing the overhead from said primary flash zone, (f) cooling and partially condensing said overhead from said primary flash zone at superatmospheric pressure in a second heat exchange contact to form additional condensate containing substantially all the remaining ethylene and ethane and an additional hydrogen rich gaseous phase containing substantially all the hydrogen and the uncondensed methane from said overhead, (g) introducing said additional condensate and said additional gaseous phase into a secondary flash zone, (h) passing the bottoms from said secondary flash zone, (i) introducing said primary flash zone bottoms and said secondary flash zone bottoms separately into a demethanizing zone, (j) furnishing the heat requirements of said demethanizing zone by condensation of propylene adjacent the bottom of said demethanizing zone for use as said first refrigerant and by condensation of ethylene at a point adjacent the central third of said demethanizing zone for use as said second refrigerant, (k) heating said bottoms after introduction into said demethanizing zone to form a methane overhead and an ethylene and ethane containing demethanizing zone bottoms, (l) cooling and condensing a portion of said methane overhead to form a methane condensate, (m) returning a portion of said methane condensate as reflux to said demethanizing zone, (n) running back said portion of said methane condensate into said demethanizing zone by force of gravity, (o) passing the remaining portion of said methane condensate and the uncondensed portion of said methane overhead countercurrently in indirect heat exchange contact against the primary flash drum overhead and thereafter countercurrently in indirect heat exchange contact against said gaseous mixture to furnish a portion of the cooling requirements of said first and second heat exchange contacts, (p) passing the overhead from said secondary flash zone, (q) passing said overhead from said secondary flash zone countercurrently in indirect heat exchange contact against the primary flash drum overhead and thereafter countercurrently in indirect heat exchange contact against said gaseous mixture to furnish the requirements of said first and second heat exchange contacts, (r) removing and fractionating said ethylene and ethane containing bottoms from the demethanizing zone into an ethane containing liquid phase and an ethylene containing vapor phase, and (s) recovering said ethylene containing vapor phase as pure product ethylene.

6. A process for recovering substantially pure ethylene from a gaseous mixture including ethylene, ethane, methane and hydrogen comprising:

cooling said gaseous mixture by passing said gaseous mixture through a first indirect heat exchange contact to form a condensate comprising a major portion of the ethylene;

cooling the uncondensed portion of the gaseous mixture by passing said undcondensed portion through a second indirect heat exchange contact to form a second condensate comprising substantially the remaining portion of the ethylene in said gaseous mixture;

separately introducing said condensates into a demethanizing zone;

separating said condensates into a demethanizing zone bottoms primarily comprising ethylene and into a demethanizing zone overhead primarily comprised of methane;

cooling and condensing a portion of said demethanizing zone overhead;

passing said condensed portion of said demethanizing zone overhead in order through said second indirect heat exchange contact and said first heat exchange contact to provide a portion of the heat exchange requirements of said first and second contacts;

passing said uncondensed portion of said gaseous mixture obtained from said second heat exchange contact in order through said second heat exchange contact and said first heat exchange contact to provide a further portion of the heat exchange requirements of said second and first contacts; and recovering substantially pure ethylene from said demethanizing zone bottoms.

7. Process according to claim 6 in which said cooling and condensing a portion of said demethanizing zone overhead comprises introducing a refrigerant into the lower portion of an upper refrigerant zone, passing said refrigerant therefrom into the lower portion of a lower refrigerant zone, withdrawing said refrigerant from the upper portion of said lower refrigerant zone, conducting said refrigerant into the upper portion of said upper refrigerant zone, removing said refrigerant from the upper portion of said refrigerant zone, conducting said demethanizing zone overhead from said demethanizing zone into an upper methane zone for cooling and partial condensation in indirect heat exchange contact above with said refrigerant in said upper refrigerant zone and below with said refrigerant in the upper portion of said lower refrigerant zone, passing said demethanizing zone ovehead downwards for further cooling and condensation in indirect heat exchange contact with refrigerant in the intermediate and lower portions of said lower refrigerant zone and thence into a lower methane zone, collecting methane rich condensate in the bottom portion of said lower methane zone, conducting said methane rich condensate out of said lower methane zone and downwards, diverting and introducing by gravity flow a sufficient portion thereof into the upper portion of said demethanizing zone to satisfy reflux requirements, expanding the remainder of said methane rich condensate to form a gaseous phase, removing the uncondensed portion of said demethanizing zone overhead from the upper portion of said lower methane zone, and combining said uncondensed portion and said gaseous phase for subsequent use in said providing of a portion of said heat exchange requirements of said second and first heat exchange contacts.

References Cited by the Examiner
UNITED STATES PATENTS

| | | | |
|---|---|---|---|
| 2,471,602 | 5/1949 | Arnold | 62—27 |
| 2,500,353 | 3/1950 | Gantt | 62—28 X |
| 2,777,305 | 1/1957 | Davison | 62—28 X |
| 2,880,592 | 4/1959 | Davison et al. | |
| 3,073,129 | 1/1963 | Grenier | 62—28 |
| 3,111,402 | 11/1963 | Cunningham | 62—27 |
| 3,186,182 | 6/1965 | Grossmann et al. | 62—28 X |

NORMAN YUDKOFF, *Primary Examiner.*

V. W. PRETKA, *Assistant Examiner.*